Nov. 24, 1970 C. F. GRESSARD 3,541,876
SINGLE LEVER CONTROL UNIT FOR HYDROSTATIC TRANSMISSIONS
Filed Jan. 16, 1969 7 Sheets-Sheet 1

INVENTOR.
CHARLES F. GRESSARD
BY Hamilton, Cook,
Renner & Kenner
ATTORNEYS

Nov. 24, 1970        C. F. GRESSARD        3,541,876

SINGLE LEVER CONTROL UNIT FOR HYDROSTATIC TRANSMISSIONS

Filed Jan. 16, 1969        7 Sheets-Sheet 2

INVENTOR.
CHARLES F. GRESSARD
BY Hamilton, Cook,
Renner & Kenner
ATTORNEYS

Nov. 24, 1970   C. F. GRESSARD   3,541,876
SINGLE LEVER CONTROL UNIT FOR HYDROSTATIC TRANSMISSIONS
Filed Jan. 16, 1969   7 Sheets-Sheet 3

INVENTOR.
CHARLES F. GRESSARD
BY Hamilton, Cook,
Renner & Kenner
ATTORNEYS

Nov. 24, 1970     C. F. GRESSARD     3,541,876

SINGLE LEVER CONTROL UNIT FOR HYDROSTATIC TRANSMISSIONS

Filed Jan. 16, 1969     7 Sheets-Sheet 4

INVENTOR.
CHARLES F. GRESSARD
BY *Hamilton, Cook.*
*Renner & Kenner*
ATTORNEYS

Nov. 24, 1970  C. F. GRESSARD  3,541,876
SINGLE LEVER CONTROL UNIT FOR HYDROSTATIC TRANSMISSIONS
Filed Jan. 16, 1969  7 Sheets-Sheet 5

INVENTOR.
CHARLES F. GRESSARD
BY Hamilton, Cook,
Renner & Kenner
ATTORNEYS

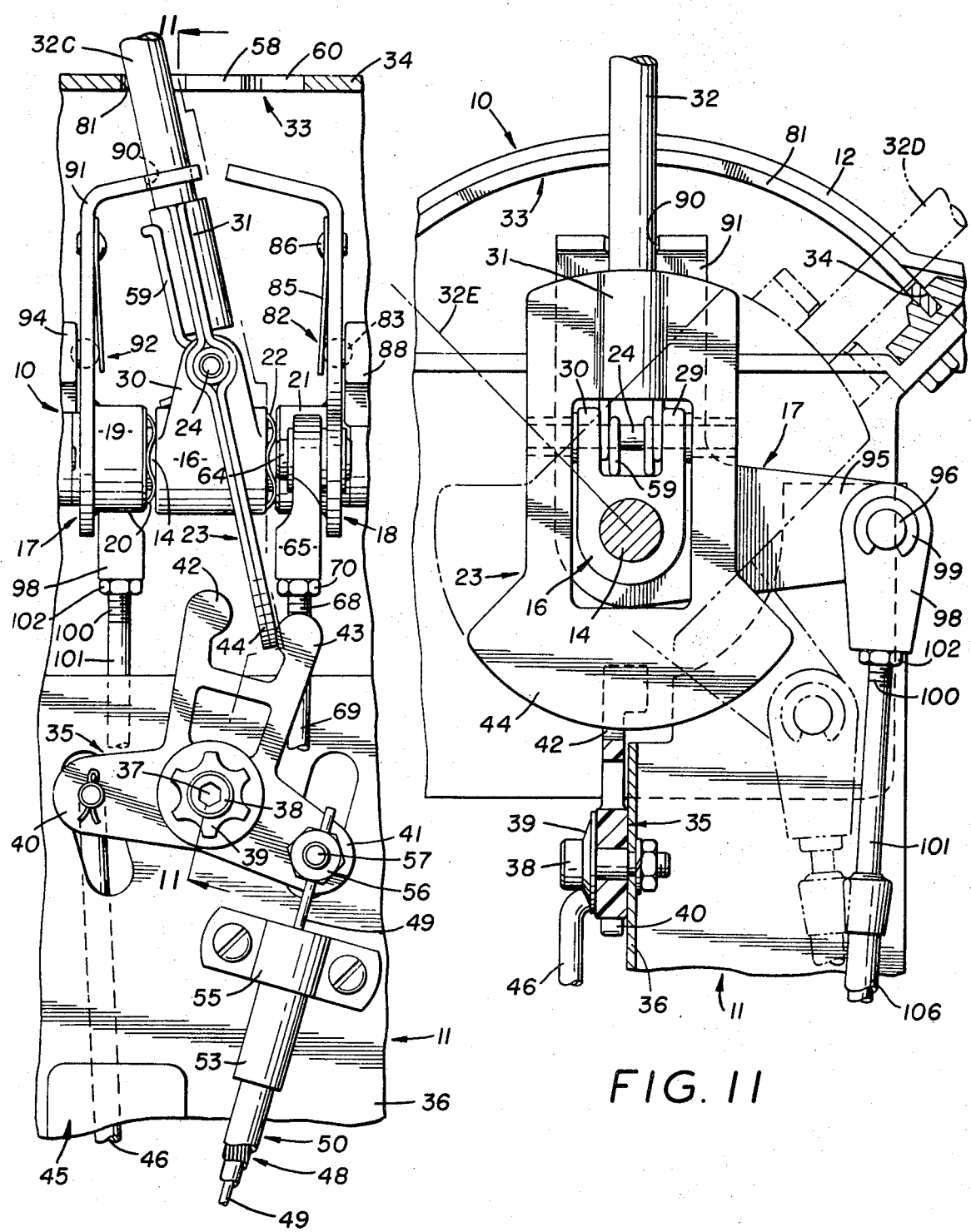

INVENTOR.
CHARLES F. GRESSARD
BY Hamilton, Cook,
Renner & Kenner
ATTORNEYS

United States Patent Office 3,541,876
Patented Nov. 24, 1970

3,541,876
SINGLE LEVER CONTROL UNIT FOR HYDROSTATIC TRANSMISSIONS
Charles F. Gressard, Kent, Ohio, assignor, by mesne assignments, to North American Rockwell Corporation, Pittsburgh, Pa., a corporation of Delaware
Filed Jan. 16, 1969, Ser. No. 791,752
Int. Cl. G05g 9/10
U.S. Cl. 74—471          10 Claims

ABSTRACT OF THE DISCLOSURE

A mechanical control unit for operating a hydrostatic transmission having one swash plate fixed and one swash plate capable of being stroked by a single level, selective movement of which also actuates an unloader valve to deactivate the transmission and, sequentially, an immobilizing mechanism to preclude rotation of the motor portion of the transmission. A stroke actuating member and an immobilization actuating member are rotatably mounted on a support shaft and selectively engageable by a control lever mounted for rotation both about the axis of the support shaft and longitudinally thereof. Rotation of the control lever about the axis of the support shaft causes rotation of the selected actuating member to effect stroking control of the hydrostatic transmission or immobilization thereof. Rotation of the control lever longitudinally of the axis of the support shaft rocks a safety actuating lever arm to operate an unloader mechanism that controls a hydraulic disconnect between the pump and motor in the hydrostatic transmission. The lever arm also operates a neutral lockout. The control unit may be provided with locking means releasably to retain the control lever and/or, selectively, the actuating members in positions predetermined on the basis of desired safe operation for the hydrostatic transmission.

BACKGROUND OF THE INVENTION

The present invention relates to controls for hydrostatic transmissions. Briefly, hydrostatic transmissions employ a hydraulic pump to operate a hydraulic motor. Both the pump and motor usually utilize multiple pistons oriented axially in spaced relation about the circumference of a circle centered on the rotational axis of the respective pump and motor rotors. A prime mover, or power source, rotates the pump rotor and effects reciprocation of the pistons therein against a pump swash plate to force the hydraulic fluid from the pump into the motor. The admission of the hydraulic fluid, under pressure, from the pump into the motor reciprocates the pistons in the latter against a motor swash plate to effect rotation of the motor rotor which is operatively connected to the device to be driven.

In some varieties of hydrostatic transmissions the inclination of both swash plates may be varied, but in many only the inclination of one of the swash plates may be varied. When the inclination of only one swash plate can be varied it is generally that swash plate associated with the pump. Hydrostatic transmissions of this latter construction are referred to as variable-pump, fixed-motor varieties. In any event, variation of swash plate inclination directly varies the displacement per stroke of the pistons acting thereagainst so that speed, and, inversely, power transmitted through the hydrostatic transmission can be infinitely varied by controlling swash plate inclination.

A control embodying the concept of the present invention is particularly adapted to the operation of a hydrostatic transmission in which the inclination of only one swash plate can be varied.

Although air, hydraulic, electric and mechanical controls have been variously employed to stroke the swash plate in hydrostatic transmissions, only the mechanical controls afford the operator with the desired tactile sensitivity. Yet, prior known mechanical controls provide mere basic directional and speed selection so that when it is desirable to deactivate and/or immobilize the transmission, additional, and separate, controls have heretofore been required.

SUMMARY OF THE INVENTION

It is, therefore, a primary object of the present invention to provide a mechanical control unit by which one swash plate in a hydrostatic transmission can be stroked by a single lever that also affords selective immobilization of the transmission.

It is another object of the present invention to provide a control unit, as above, which automatically affects a hydraulic disconnect between the hydraulic pump and hydraulic motor in the hydrostatic transmission by actuation of an unloader valve whenever the control lever is disengaged from the actuating member that effects stroking of the swash plate.

It is yet another object of the present invention to provide a control unit, as above, which incorporates a neutral lockout.

These and other objects will become apparent from the following specification are accomplished by means hereinafter described and claimed.

In general, a control unit embodying the concept of the present invention is adapted to stroke one swash plate of a hydrostatic transmission and is, therefore, particularly adapted for the variable-pump, fixed-motor variety. A stroke actuating member and an immobilization actuating member are movably mounted in the housing of the control unit. The control lever is movable in one direction selectively to engage either the stroke actuating member or the immobilization actuating member. When the control lever disengages from the stroke actuating member and moves toward the imobilization actuating member it effects movement of a safety actuating means hydraulically to disconnect the hydraulic pump from the hydraulic motor in the hydrostatic transmission and, simultaneously, operate a lockout switch which prevents starting of the prime mover that drives through the hydrostatic transmission when the control lever is engaged with the stroke actuating member.

The control lever is also movable in a second direction transversely the first direction selectively to move either the stroke actuating member or the mobilization actuating member. Various locking means may be incorporated in the control unit to retain the control lever and/or the actuating members in positions predetermined on the basis of desired safe operation for a hydrostatic transmission.

One preferred embodiment, and three variations thereof, are shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 10 is a view similar to FIG. 3 depicting the control lever in the neutral-stroke position;

FIG. 11 is an inclined vertical section taken substantially on line 11—11 of FIG. 10 depicting, in solid line, the control lever in the neutral-stroke position, and, in phantom, in the full forward position;

DESCRIPTION OF THE PREFERRED EMBODIMENTS

Figure 6:
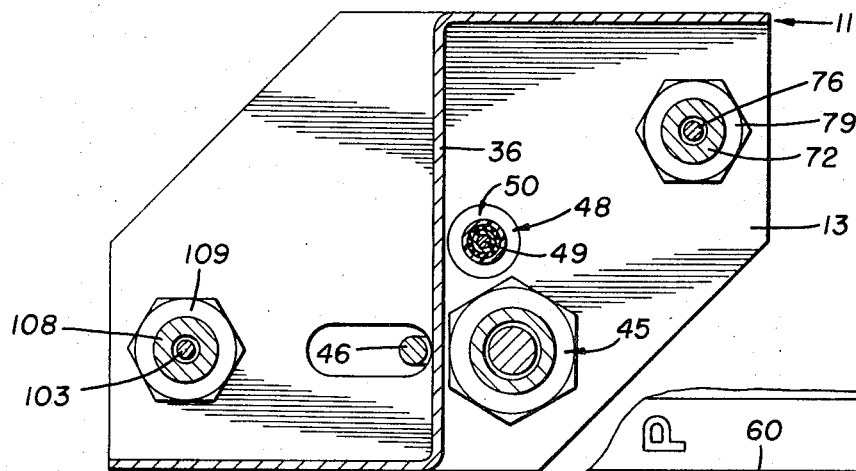
FIG. 6 is a horizontal section taken substantially on line 6—6 of FIG. 1.

Referring more particularly to the drawings, a control embodying the concept of the present invention is designated generally by the numeral 10. A hanger plate 11 of Z cross section (FIG. 6) is secured to, and depends from, the housing 12 of the control 10. A foot shelf 13 is affixed across the base of the hanger plate 11 in spaced relation below the housing 12 for mounting the motion transmitting devices, as more fully hereinafter set forth.

Figure 9:
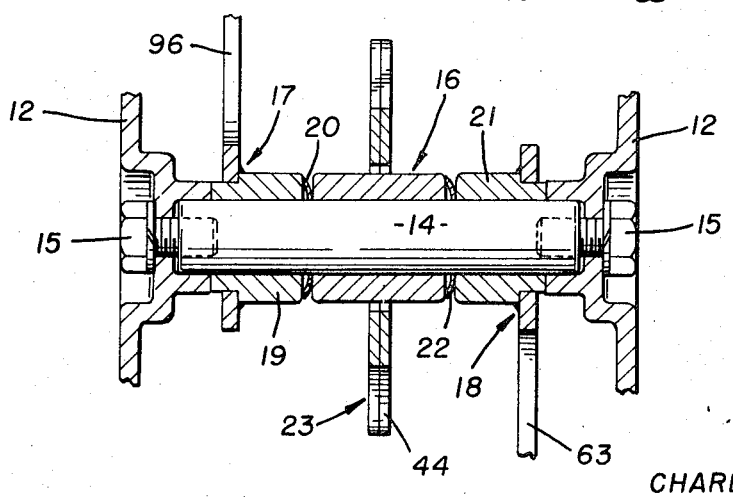
FIG. 9 is a horizontal section taken substantially on line 9—9 of FIG. 2.

A support shaft 14 extends between opposed sides of the housing 12 and is fixed therein, as by cap screws 15 (FIG. 9). A quill 16 is rotatably mounted on the medial portion of the support shaft 14 between first and second actuating members 17 and 18, also rotatably mounted on the support shaft 14. The hub 19 of the first, or stroke, actuating member 17 is rotatably carried on one side of the quill 16 and is separated therefrom by a spring washer 20. The hub 21 of the second, or immobilization, actuating member 18 is rotatably carried on the other side of the quill 16 and is separated therefrom by a second spring washer 22.

A pivot plate 23 is swingingly mounted on a pivot pin 24 oriented transversely the axis 25 of the support shaft 14 and carried in the aligned bores 26 and 28 (FIG. 4) of the spaced, parallel bracket arms 29 and 30 extending outwardly from the quill 16. A socket 31 is provided in the pivot plate 23 to support the control lever 32 that extends upwardly of the shaft 14 and through a guide slot 33 in gate plate 34 carried on the housing 12.

Beneath the support shaft 14 a safety actuating lever means, or rocker arm, 35 is carried on the web 36 of the hanger plate 11 to rock about an axis 37 also oriented transversely of the support shaft 14. Specifically, the rocker arm 35 which actuates a neutral lockout and an unloader valve, is rockably mounted on a stripper bolt 38 with a spring washer 39. The rocker arm 35 itself comprises a pair of laterally extending wings 40 and 41 and a pair of spaced, upwardly directed fingers 42 and 43 that straddle the downwardly directed, arcuately bounded blade portion 44 of pivot plate 23. The wing 40 is the neutral lockout wing because wing 40 actuates a switch 45, mounted on the foot shelf 13, by means of a link 46 which connects between wing 40 and switch 45. The switch 45 prevents the engine or prime mover (not shown), from being started except when the control lever 32 is in the neutral-unload or immobilization ranges, as are hereinafter more fully explained.

The wing 41 is the unloader wing because that wing is operatively attached by a motion transmitting mechanism 48, to a valve (not shown) that controls the fluid flow from the hydraulic pump in the hydrostatic transmission selectively to either the hydraulic motor or a reservoir from which it is recirculated to the hydraulic pump.

The motion transmitting device 48 is preferably a push-pull control cable and may be of any conventional construction in which a core 49 slidably reciprocates within a casing, indicated generally by the numeral 50, to transmit mechanical motion by the application of tensile or compressive forces to the core while at least the ends of the casing are clamped in a relatively fixed position with respect to the core 49. In the exemplary construction depicted the casing 50 is formed of a plurality of casing wires 51 laid contiguously, in the form of a long pitched helical coil, about the radially outer surface of an inner, flexible, plastic tube 52 which extends the full length of the casing 50. An outer cover 53 encases the coil of wires 51 up to within a short distance from the ends thereof. A fitting 54 is positioned over the end of the cable casing 50 and is cold swaged, or otherwise suitably connected, onto the exposed portion of the cylindrical grouping of wires 51. A plurality of ribs, not shown, may be provided within the end fitting 54 which, when crimped onto the outer cover 53, effects a seal between the end fitting 54 and cover 53.

The end fitting 54 is secured to the web 36 of the hanger plate 11 by a clamp 55, and the core 49 extends outwardly of the end fitting 54 and is secured within a counting block 56, as by a lock screw 57, carried on wing 41.

Figure 3:
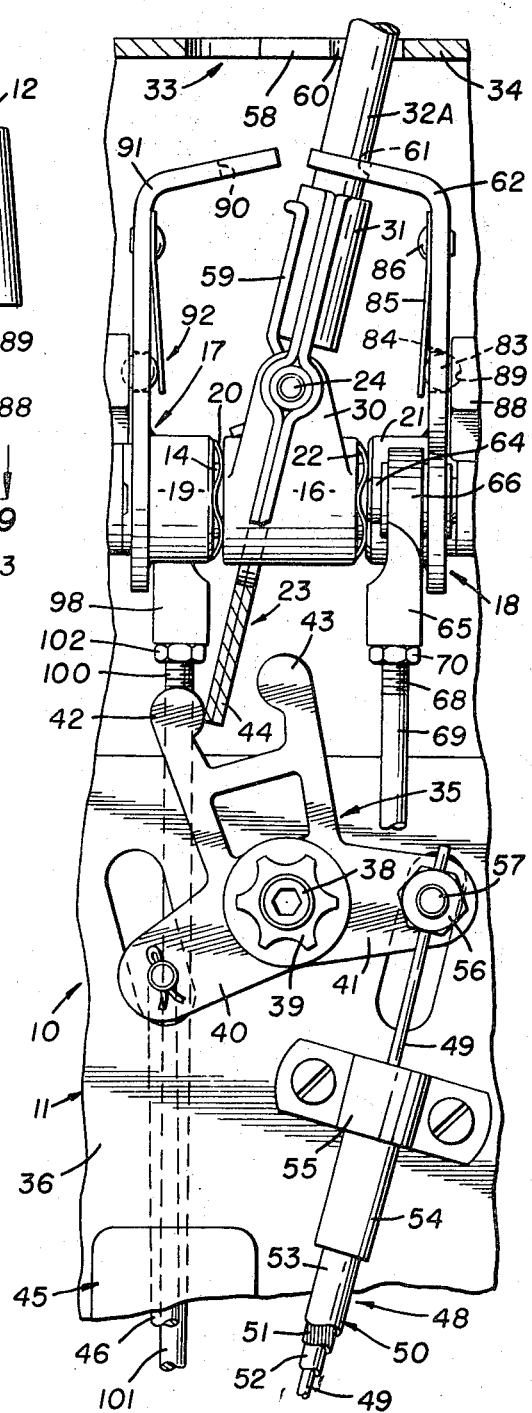
FIG. 3 is a partial area of FIG. 2 depicting the control lever in the neutral-unload position.
Figure 4:
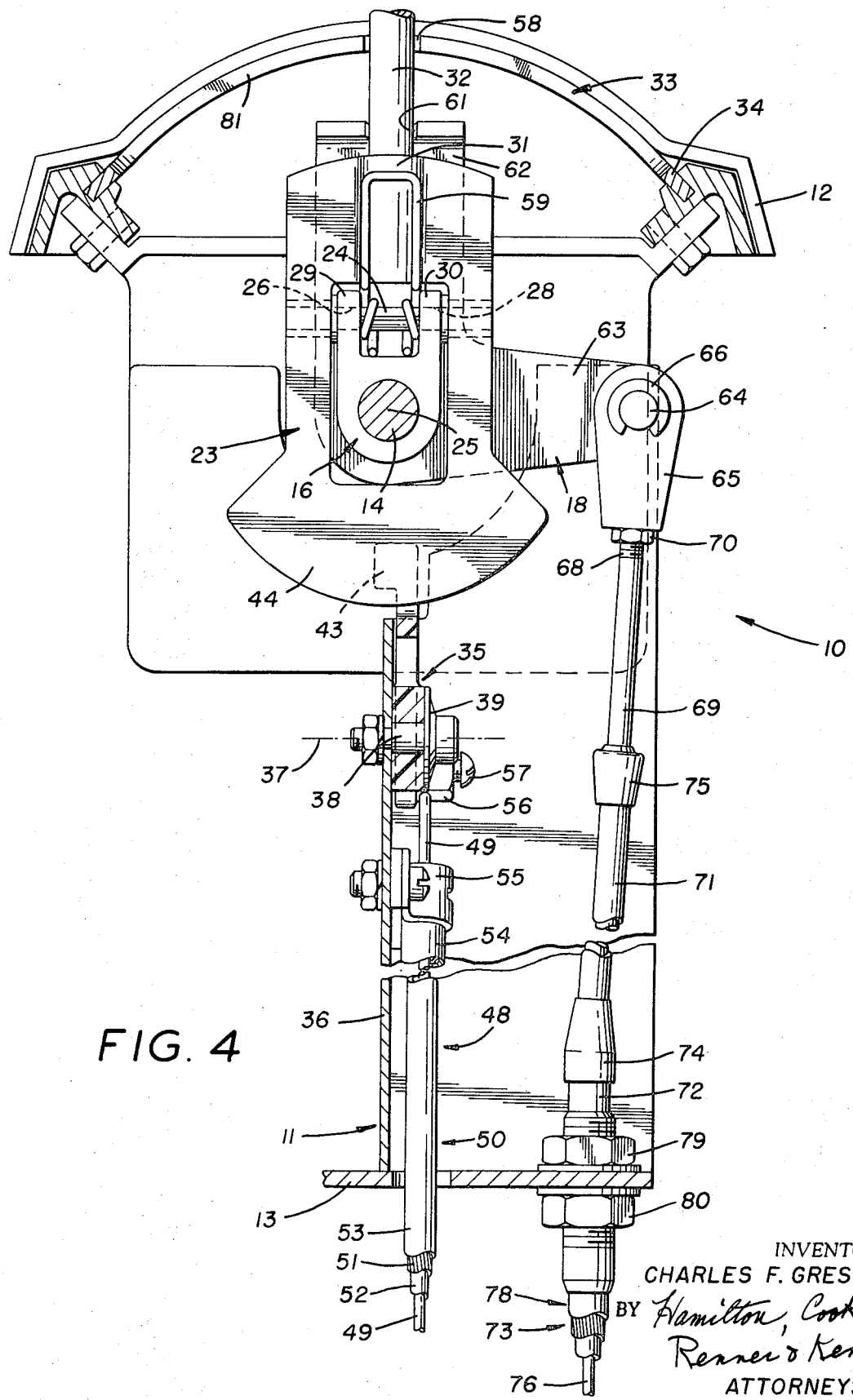
FIG. 4 is a vertical section taken substantially on line 4—4 of FIG. 2.

Any time that the control lever 32 is in the neutral portion 58 of guide slot 33 (FIG. 5), a neutral spring 59 biases the control lever 32 longitudinally of shaft 14 toward alignment with the immobilizing portion 60 of slot 33. That position, shown in FIG. 3, is the neutral unload position 32A. As best shown in FIG. 4, the neutral spring 59 coils about the pivot pin 24 between the bracket arms 29 and 30 to abut the quill 16 and react against one side of the control lever 32, actually socket 31, and bias the control lever to the neutral-unload position 32A. Movement of the control lever 32 along the neutral portion 58 of slot 33 to the neutral-unload position 32A also brings the blade portion 44 of the pivot plate 23 into engagement with finger 42 to rotate the rocker arm 35 counterclockwise, as shown in FIG. 3, and thereby apply a pull to the core 59 of cable 48 which actuates the unloader valve (not shown) so that the pressurized fluid emitted from the pump or the hydrostatic transmission will be directed to the supply reservoir for the pump rather than being directed to the hydraulic motor in the transmission. Accordingly, with the lever in the neutral-unload postion 32A the hydrostatic transmission is inoperable.

As the control lever 32 thus moves into the neutral-unload position 32A it engages a concave recess 61 in the furcated engaging arm 62 that extends generally upward from the hub 21 of the immobilization actuating member 18. A throw arm 63 (FIG. 4) extends generally laterally of the hub 21 and presents a stud 64, oriented in parallel relation with the axis 25 of the support shaft 14, on which a swing connector 65 is rotatably retained by a spring clip 66.

The base portion of the swing connector 65 may be bored and tapped to receive the threaded portion 68 of an end rod 69 therein. A lock nut 70 secures the attachment of the end rod 69 to the swing connector 65.

The end rod 69 is slidably received within an extension tube 71 that is gyrationally mounted on an end fitting 72 of the push-pull cable comprising the force transmitting device 73. The gyrational mounting, which is generally a modified ball and socket arrangement (not shown), is preferably protected by a resilient sealing sleeve 74. A similar resilient sealing sleeve 75 is also preferably positioned at the entrance of the end rod 69 into the extension tube 71.

The push-pull cable 73 may be of any conventional construction in which a core 76 slidably reciprocates within a casting, indicated generally by the numeral 78, to transmit mechanical motion by the application of either tensile or compressive forces to the core 76 while at least the end of the casing 78 are clamped in a relatively fixed position with respect to the core 76. The exemplary push-pull cable 73 depicted is of the same construction as cable 48 described in detail above. The end fitting 72, which is attached to the cable casing 78, is secured to the foot shelf 13, as by embracing unts 79 and 80 that are carried on the threaded outer surface of the end fitting 72.

The end rod 69 is secured to the cable core 76 in a well-known fashion so as to become, in effect, an extension thereof. The extension tube 71 not only guides the rod 69 as it slides therein but also prevents excessive deflection of that portion of the core 76 which slides therein, particularly when subjected to compressive loads.

Figure 8:
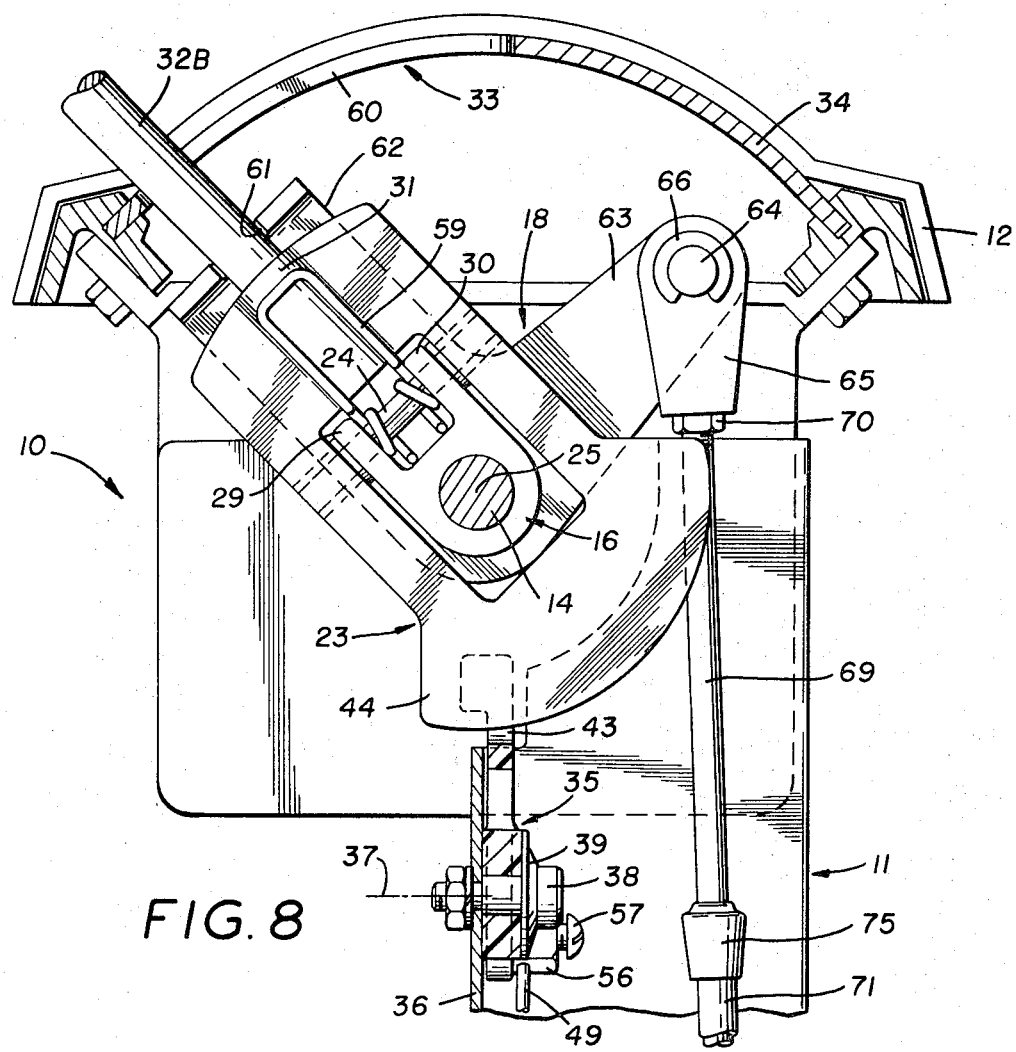
FIG. 8 is a view similar to a portion of FIG. 4 depicting the control lever moved to the park position—i.e., the position of the control lever when the transmission is immobilized.

With the control lever received within the recess 61 of the furcated engaging arm 62, counterclockwise rotation of the control lever 32 from the neutral-unload position 32A (FIG. 3) to the immobilized, or park, position 32B (FIG. 8)—indicated by the letter "P" on gate plate 34 (FIG. 5)—will rotate the immobilization actuating member 18 counterclockwise as viewed in FIGS. 4 and 8, and thus apply a withdrawal motion of the end rod 69 with respect to the extension tube 71. The tensile force thus applied to the core 76 actuates a locking mechanism (not shown) associated with the motor position of the hydrostatic transmission. Generally, a fixed pin, not shown, or the like, is moved into engagement with a rotational component of the hydraulic motor rotor to preclude any rotation thereof.

Even while the control lever 32 is in the immobilized position 32B, the arcuately bounded plate portion 44 of the pivot plate 23 remains in engagement with finger 42 on the rocker arm 35 so that the unload valve of the hydrostatic transmission will be retained in a position to preclude access of the pressurized fluid from the hydraulic pump to the hydraulic motor. This engagement of the blade portion 44 with the rocker arm 35 also maintains the switch 45 positioned such that the engine can be started only so long as the control lever is in either the neutral-unload position 32A or the immobilized position 32B.

To activate the transmission the control lever 32 is retro-rotated from the immobilized position 32B to the neutral-unload position 32A and then swung laterally of the control 10 (longitudinally of support shaft 14) across the neutral portion 58 of guide slot 33 into alignment with the stroke portion 81 thereof. This position 32C, as depicted in FIG. 10, shall henceforth be termed the neutral-stroke position. As the control lever moves from the neutral-unload position 32A to the neutral-stroke position 32C there are several simultaneous mechanical occurrences.

Figure 2:
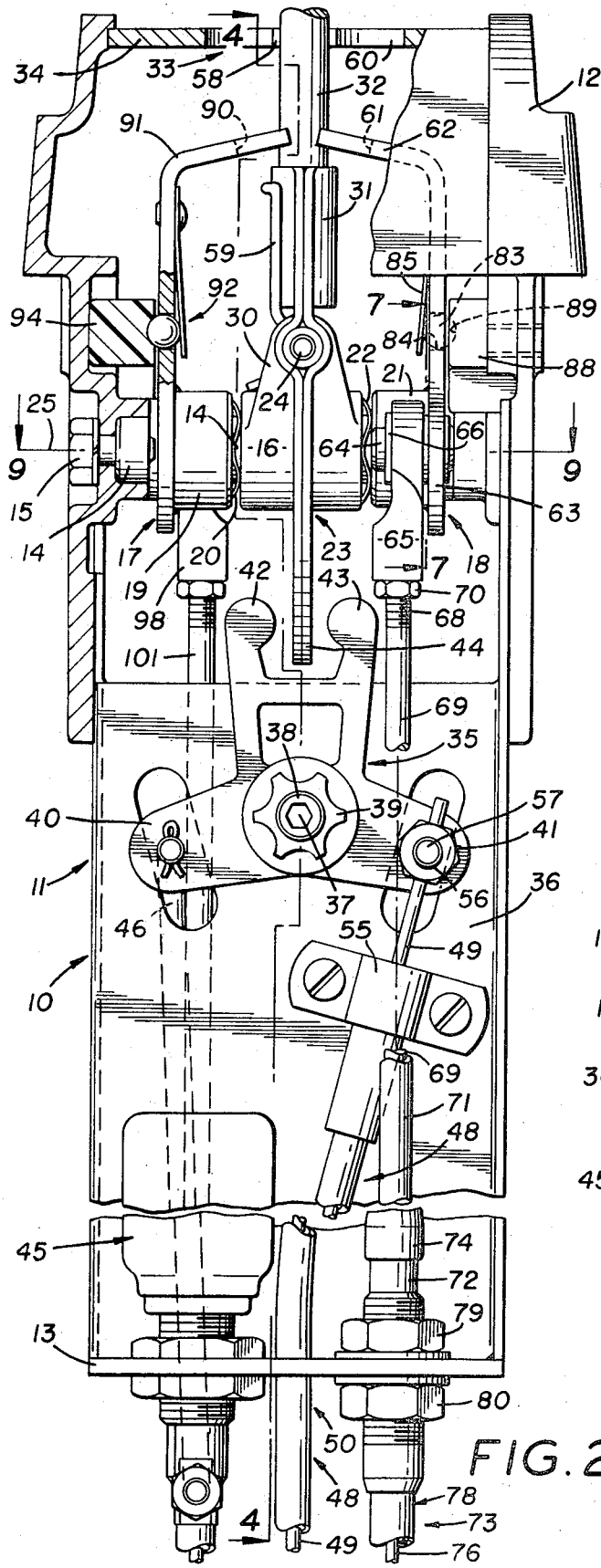
FIG. 2 is an end elevation, also partly broken away, taken substantially on line 2—2 of FIG. 1 and depicting the control lever midway between the neutral-stroke and the neutral-unload positions.
Figure 7:
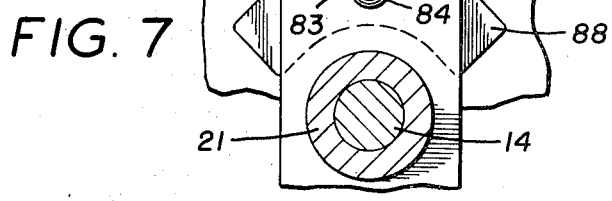
FIG. 7 is a vertical section taken substantially on line 7—7 of FIG. 2.

First, the immobilization actuating member 18 is restrained against further motion, as by detent means 82. The detent 82, as depicted in FIGS. 2, 7 and 10, comprises a ball 83 that is slidably received with a bore 84 through the engaging arm 62. The ball 83 has a diameter greater than the thickness of the engaging arm 62 so that a flat spring 85 secured to the arm 62, as by screw 86, and engaging the ball 83 will bias it against a detent block 88 secured to the housing 12. A hemispherical depression 89 in the detent block 88 receives the ball 83 when the control lever is located in the neutral-unload position 32A depicted in FIG. 3.

Figure 1:
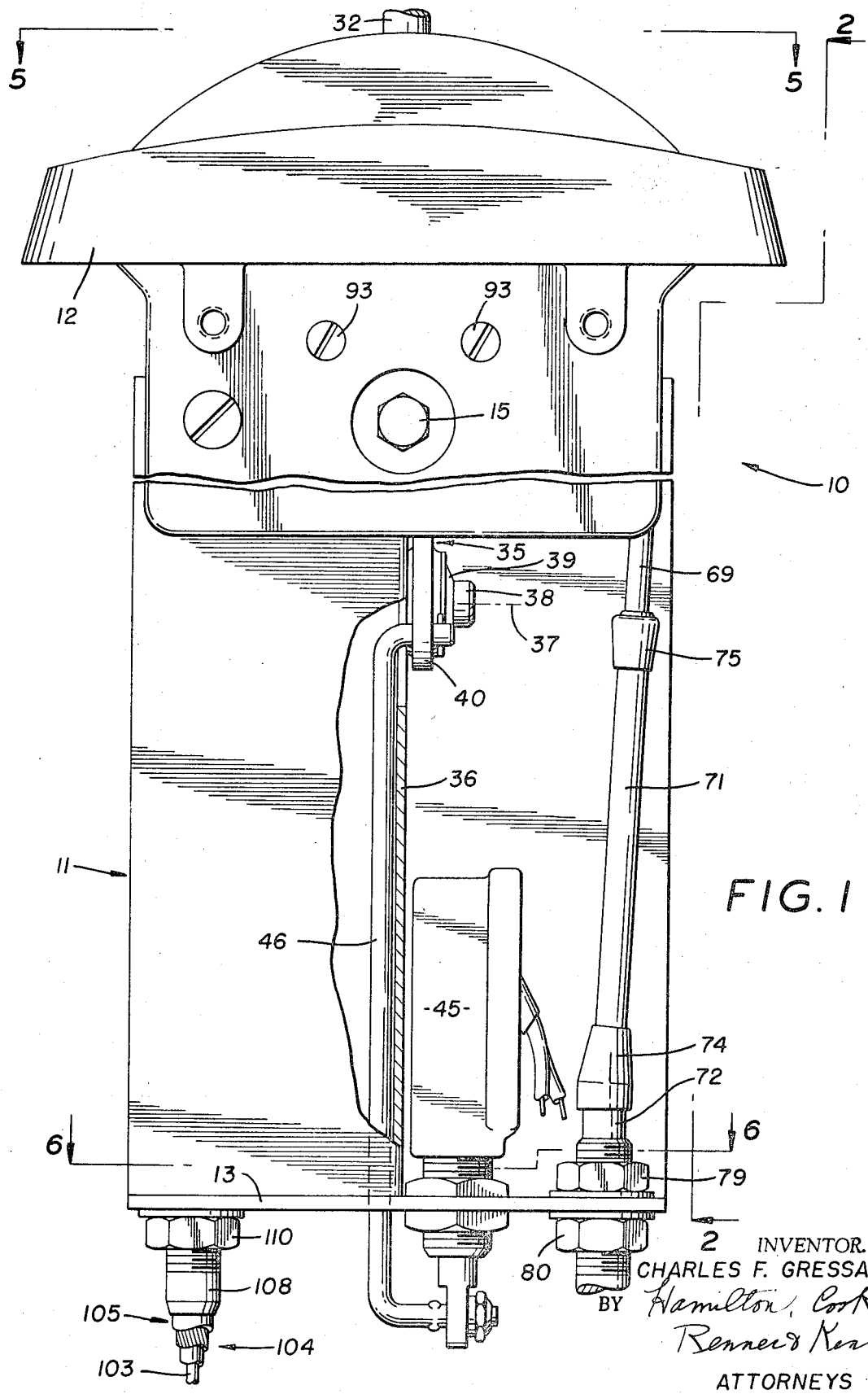
FIG. 1 is a side elevation, partly broken away, of a control embodying the concept of the present invention.

Second, the control lever 32 leaves the concave recess 61 in the furcated engaging arm 62 of the immobilization actuating member 18 and enters an opposed concave recess 90 in the furcated engaging arm 91 that extends generally upwardly from the hub 19 of the stroke actuating member 17. The stroke actuating member 17 may be retained in a position to recieve the control lever 32 by a detent means 92 similar to the detent means 82 used in conjunction with the immobilization actuating member 18. FIG. 1 depicts the two screws 93 used to mount the detent block 94 of detent means 92 on the housing 12. The detent block 88 of detent means 82 may be similarly mounted.

Third, the blade portion 44 of the pivot plate 23 engages the finger 43 to rotate the rocker arm 35 clockwise, as viewed in the drawings, from the position represented in FIG. 3 to the position represented in FIG. 10. This rotation of the rocker arm accomplishes two additional functions.

First, the core 49 of the push-pull cable 48 is subjected to a compressive load so that the core 49 will slide into the casing 50. This relative motion of the core 49 with respect to the casing 50 actuates the unloader valve (not shown) so that the pressurized fluid emanating from the hydraulic pump of the hydrostatic transmission will be permitted to flow into the hydraulic motor thereof rather than being diverted to the reservoir that feeds the pump.

Second, the switch 45 is actuated so that the engine driving the hydraulic pump cannot be started, although the engine, if started, will continue to operate.

Figure 5:
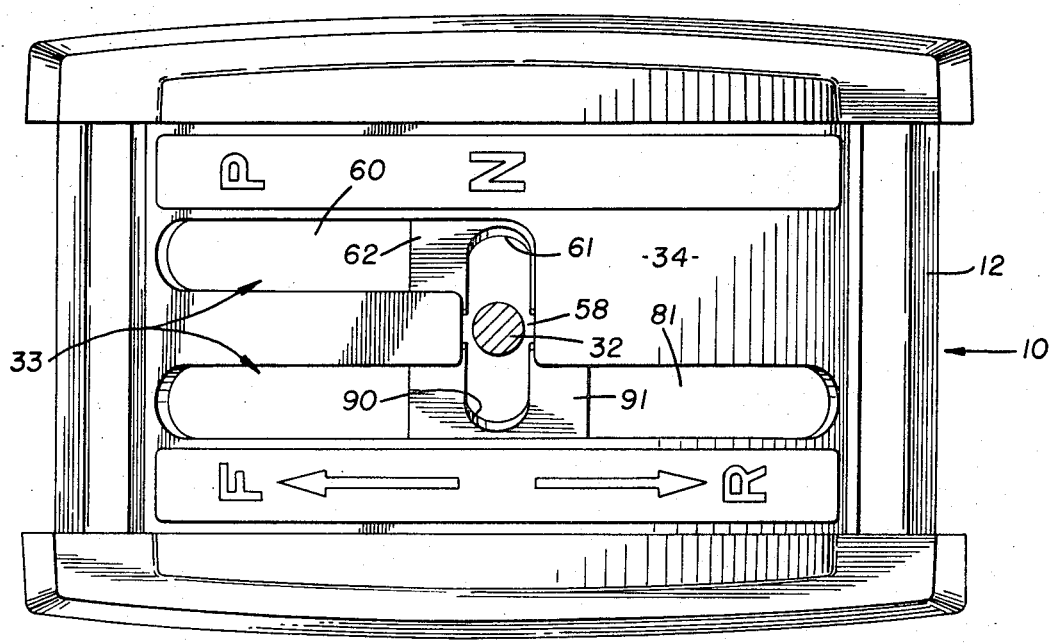
FIG. 5 is a top plan taken substantially on line 5—5 of FIG. 1 to depict the gate plate.

With the control lever 32 in the neutral-stroke position 32C the operator of the mechanism regulated by the control 10 may elect to drive it either forwardly or reversely by a concomitant rotational movement of the lever 32 within the drive portion 81 of slot 33—i.e., in those respective directions indicated by the letters "F" and "R" on the gate plate 34 (FIG. 5). The degree to which the operator thus rotates the lever selects the speed at which the mechanism is driven by the hydrostatic transmission.

The stroke actuating member 17 is also provided with a throw arm 95 that extends generally laterally from the hub 19 and presents a stud 96, oriented in parallel relation with the axis 25 of support shaft 14. A swing connector 98 is rotatably retained on the stud 96 by a spring clip 99, and the base portion of the swing connector 98 is bored and tapped to receive the threaded portion 100 of an end rod 101. A lock nut 102 maintains the threaded connection between the end rod 101 and the swing connector 98.

The end rod 101 is secured to the core 103 (FIG. 1) of push-pull cable 104 in a well-known manner so as to become, in effect, an extension thereof. Push-pull cable 104 may be of any conventional construction in which a core 103 slidably reciprocates within a casing, indicated generally by the numeral 105, to transmit mechanical motion by the application of either tensile or compressive forces to the core 103 while at least the ends of the casing 105 are clamped in a relatively fixed position with respect to the core 103. The exemplary push-pull cable 104 depicted is of the same construction as cable 48 described in detail above.

The end rod 101 is slidably received within an extension tube 106 that is gyrationally mounted on an end fitting 108 secured, in a conventional manner, to the casing 105 of the push-pull force transmitting device 104. The gyrational mounting of the extension tube 106 on the end fitting 108 is generally a modified ball and socket arrangement, not shown. The extension tube 106 not only guides the rod 101 as it slides therein, but also prevents excessive deflection of that portion of the core 103 which slides therein, particularly when subjected to compressive loads.

The end fitting 108 is secured to the foot shelf 13, as by embracing nuts 109 and 110 that are carried on the threaded outer surface of the end fitting 108.

With the control lever 32 engaged within the concave recess 90 of engaging arm 91 rotation thereof within the stroke portion 81 of guide slot 33 will impart a corresponding rotation of throw arm 95. Accordingly, as the control lever 32 is moved from the neutral-stroke position 32C (FIG. 10 and the solid line representation in FIG. 11) toward full forward position 32D (the phantom representation in FIG. 11) the clockwise rotation of the stroke actuating member 17, as viewed in FIG. 11, will apply a compressive load on core 103 by the axial insertion of the end rod 101 into extension tube 106. With the push-pull cable 104 being operatively attached to one (generally the pump) swash plate of a hydrostatic transmission, this compressive load on core 103 will stroke the swash plate to effect forward drive through the transmission. The full forward position 32D of the control lever thus represents the fully stroked position of the hydraulic pump—i.e., the pump swash plate will have been moved through its complete displacement range.

Retro-rotation of the control lever, as viewed in FIG. 11, from the full forward drive position 32D toward the neutral-stroke position 32C will result in a withdrawal motion of the end rod 101 from the extension tube 106 and thereby apply a tensile load to the core 103. The tensile load will reverse the stroke of the swash plate so that when the control lever arrives at the neutral-stroke position 32C forward drive by the transmission will cease. At this point the operator may release the control lever 32 and it will swing, under the biasing effect of neutral spring 59, to the neutral-unload position 32A, or the operator may continue rotation of the control lever 32 within the stroke portion 81 of guide slot 33 toward the full reverse position indicated by the chain center line 32E. This latter rotation continues the impartation of a withdrawal motion of the end rod 101 from the extension tube 106 and thereby continues the reverse stroking of the pump swash plate past neutral so that the hydrostatic transmission will provide reverse drive.

In some installations the connection between the cable core 103 and the pump swash plate will comprise a resilient, lost motion device so that while the swash plate will move generally with the motion of the control lever 32, there may be some lag therebetween. Under such circumstances it is conceivable that the control lever could reach the neutral-stroke position 32C and be swung toward the neutral-unload position 32A before the swash plate reached the neutral position. For those hydrostatic transmissions wherein the swash plate tends to seek neutral the use of detent means 92 to retain the recess 90 on the furcated engaging arm 91 of the stroke actuating member 17 in alignment with the neutral portion 58 of slot 33 may be sufficient. However, particularly with those transmissions that do not tend to seek neutral the detent means 92 may not afford sufficient restraint so that when the control lever 32 is disengaged from the recess 90 the back pressure inherent to such a swash plate could itself rotate the stroke actuating member 17. Under such circumstances the recess 90 in the furcated engaging arm 91 would become disaligned from the neutral portion 58 of slot 33 so that the control lever 32 could not be re-engaged therewith.

Figure 12:
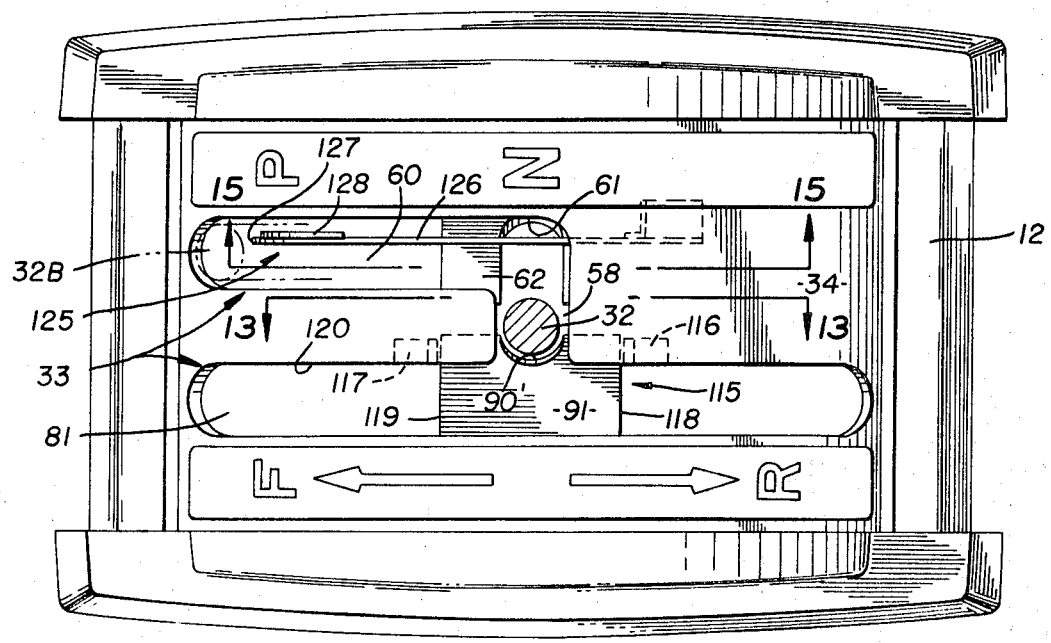
FIG. 12 is a view similar to FIG. 5 depicting the inclusion of two alternative variations.
Figure 13:
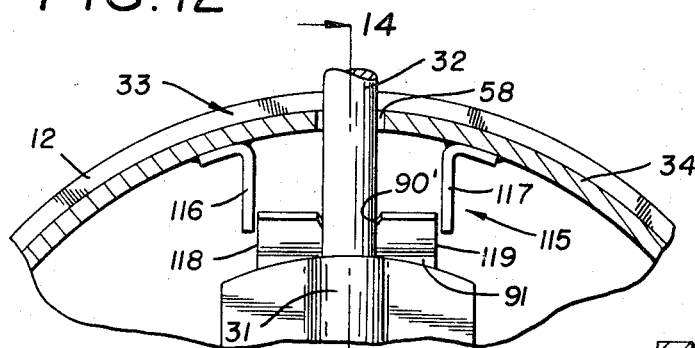
FIG. 13 is a vertical section taken substantially on line 13—13 of FIG. 12.

To preclude such a possibility a releasable locking means 115 may be substituted for the detent means 92. As shown in FIGS. 12 and 13 the lock means 115 may comprise a pair of spaced lock lugs 116 and 117 secured to the gate plate 34 and depending therefrom in spaced relation to embrace the edges 118 and 119 of the furcated engaging arm 91 in alignment with the direction along which the stroke actuating member 17 rotates. With the furcated engaging arm 91 positioned between the lock lugs 116 and 117 rotation of the stroke actuating member 17 is thus precluded. In order that the operator may selectively rotate the stroke actuating member 17 when the locking means 115 is employed, it is necessary that the furcated engaging arm 91 be resilient and that the recess 90′ thereon extend less deeply into the arm so that as the operator swings the control arm from the neutral-unload position 32A to the neutral-stroke position 32C the arm 32 will engage the recess 90′ and flex the arm 91 to disengage it from between lock lugs 116 and 117. Once the control arm moves toward the full forward position 32D or toward the full reverse position 32E it will engage the laterally inner side 120 of the drive portion 81 of slot 33 and thereby permit the operator to release the lateral pressure on the control lever 32 without interference between the arm 91 and the lock lugs 116 and 117. However, when the control lever is returned to the neutral-stroke position 32C the arm 91 will engage between the lugs 116 and 117 unless the operator maintains sufficient lateral pressure on the control lever 32 to overcome the resilience of the arm 91. With such a locking device 115 the recess 90′ will be positively retained in alignment with the neutral portion 58 of the guide slot 33 irrespective of the back pressure applied by the swash plate.

Figure 15:
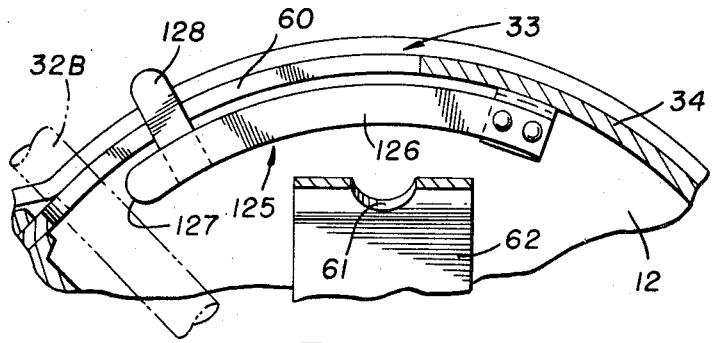
FIG. 15 is a vertical section taken substantially on line 15—15 of FIG. 12.
Figure 14:
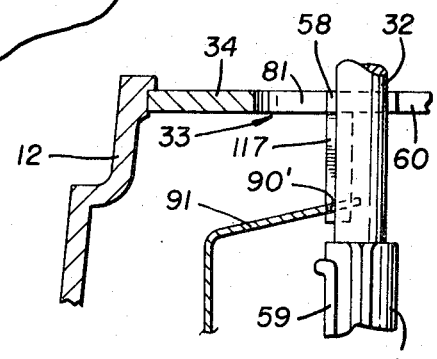
FIG. 14 is a further vertical section taken substantially on line 14—14 of FIG. 13.

In some installations the connection between the cable core 76 and the immobilizing mechanism associated with the motor portion of the hydrostatic transmission may comprise a resilient, lost motion device so that while the immobilizing mechanism will actuate in response to rotation of the control lever 32 in the immobilizing portion 60 of slot 33, there may be a lag. Should this lag occur when the control lever 32 is rotated from the neutral-unload position 32A to the immobilizing position 32B and should the operator release the control lever 32 before the immobilizing mechanism was fully actuated, the resilient lost motion device might well retro-rotate the control lever from the immobilizing position 32B to the neutral-unload position 32A. Accordingly, it may be desirable to assure retention of the control lever in the immobilizing position 32B. This result can well be affected by a releasable locking mechanism 125, as best shown in FIGS. 12 and 15. The locking mechanism 125 comprises a spring arm 126 mounted on the housing 12 and extending beneath the immobilizing portion 60 of slot 33 such that the control lever 32 cannot enter the immobilizing portion 60 without flexing the spring arm 126. The dimensions of the spring arm 126 are such that when the control lever reaches the immobilizing position 32B the arm 126 will snap behind the control lever 32 and present a blocking edge 127 thereagainst which prevents retro-rotation of the lever 23 to the neutral-unload position 32A.

A release tab 128 extends upwardly from the spring arm 126, through the immobilizing portion 60 of slot 33, in proximity to the control lever 32 so that when the operator desires to rotate the lever 32 from the immobilizing position 32B to the neutral-unload position 32A he need merely apply lateral pressure to the tab 128 which swings the blocking edge 127 clear of the lever 32 and permits it to be rotated from the immobilizing position 32B to the neutral-unload position 32A.

Figure 16:
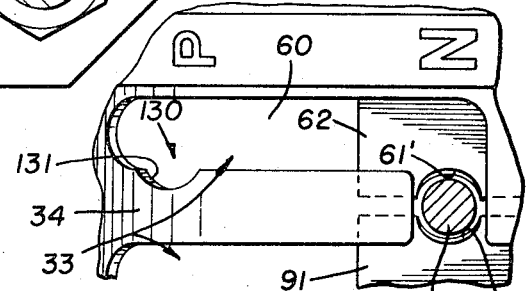
FIG. 16 is a view similar to FIG. 12, but including only a partial area thereof, depicting a third alternative variation.

As a further alternate construction for a retaining means 130 that will adequately retain the control lever in the park position 32B, a modified recess 61′—cutting lesser depths than recess 61—may be employed on a resilient engaging arm 62 in conjunction with a lateral offset 131 in the immobilizing portion 60 of slot 33, as shown in FIG. 16.

With this construction when the control lever is moved, by neutral spring 59, to the neutral-unload position 32A the operator must apply some additional lateral pressure against the control lever 32 to flex the engaging arm 62 and permit the control lever 32 to enter the immobilizing portion 60 of slot 33. When the control lever is rotated to the immobilizing position 32B the resilience in the arm 62 will forcibly retain the lever 32 in the offset 131.

A mechanical control embodying the concept of the present invention thus permits stroking of a swash plate in a hydrostatic transmission with a single lever that also selectively effects deactivation and/or immobilization of the transmission and otherwise accomplishes the objects thereof.

I claim:
1. A control unit for stroking the swash plate of a hydrostatic transmission comprising, a housing, at least one actuating member movably mounted in said housing, said actuating member being adapted for operative connection to a motion transmitting device for stroking the swash plate, arm means on said actuating member, a control lever mounted in said housing for movement in at least two generally transverse directions, said arm means being selectively engaged by movement of said control lever in a first direction, movement of said control lever in the second direction effecting concomitant movement of the actuating member to stroke the swash plate, a safety actuating means movably mounted in said housing, said safety actuating means being adapted for operative connection to a motion transmitting device for operating an unloader mechanism to deactivate the hydrostatic transmission, movement of said control lever in the first direction away from engagement with the arm means on the actuating member for stroking the swash plate operating said safety actuating means to deactivate the hydrostatic transmission.

2. A control unit, as set forth in claim 1, in which locking means retain said actuating member fixedly positioned when said control lever is disengaged therefrom.

3. A control unit, as set forth in claim 1, in which a second actuating member is movably mounted in said housing, said second actuating member being adapted for operative connection to a motion transmitting device for operating an immobilizing mechanism, arm means on said second actuating member opposed to the arm means on said first actuating member, movement of said control lever in the first direction affecting selective engagement with said opposed arm means, movement of said control lever in a direction parallel with the second direction affecting concomitant movement of said second actuating member.

4. A control unit, as set forth in claim 3, in which releasable locking means retain said first actuating member fixedly positioned when said control lever is disengaged therefrom and in which additional releasable locking means retain said second actuating member fixedly positioned when moved to actuate the immobilizing mechanism.

5. A control unit, as set forth in claim 1, in which the actuating member is rotatably supported on a shaft means carried in said housing, a quill rotatably supported on said shaft means adjacent said actuating member, the control lever pivotally mounted on said quill for rotation with said quill about said shaft means and for rotation with respect to said quill longitudinally of said shaft means and in which the safety actuating means is a rocker arm rockably mounted in said housing and adapted for operative connection to the motion transmitting device for operating an unloader mechanism to deactivate the hydrostatic transmission, blade means carried on said control lever to rock said rocker arm in response to rotation of the control lever with respect to said quill.

6. A control unit, as set forth in claim 5, in which a neutral spring interacts between said quill and said control lever to bias said control lever with respect to said quill toward engagement with the recess in the furcated arm of said actuating member.

7. A control unit for stroking the swash plate of a hydrostatic transmission comprising, a housing, at least one actuating member, said actuating member being rotatably supported on a shaft means carried in said housing and being further adapted for operative connection to a motion transmitting device for stroking the swash plate, arm means on said actuating member, a quill rotatably supported on said shaft means adjacent said actuating member, a control lever pivotally mounted on said quill for rotation with said quill about said shaft means and for rotation with respect to said quill longitudinally of said shaft means, a gate plate mounted on said housing, a guide slot opening through said gate plate, said control lever extending through and movable along said guide slot, said guide slot having a neutral portion oriented generally parallel with said shaft means, movement of said control lever along the neutral portion of said slot effecting selective engagement of the control lever with said arm means, said guide slot also having a stroking portion oriented generally transversely of the shaft means and communicating with said neutral portion, movement of said control lever along the stroking portion of said slot effecting concomitant movement of the actuating member to stroke the swash plate, and locking means in the form of a pair of lock lugs positioned in said gate plate embracingly to retain said arm means aligned with the neutral portion of said guide slot, said arm means being resilient so that pivotal movement of the control lever from the neutral position into the stroking portion of the guide slot will disengage said arm means from said lock lugs.

8. A control unit, as set forth in claim 7, in which a second actuating member is rotatably supported on said shaft means, said second actuating member being adapted for operative connection to a motion transmitting device for operating an immobilizing mechanism, arm means on said second actuating mechanism, the guide slot in said gate plate also having an immobilizing portion, said immobilizing portion oriented generally transversely of said shaft means and intersecting said neutral portion in spaced relation from said stroking portion, pivotal movement of said control lever with respect to said quill so as to move the control lever through the neutral portion from the stroking portion toward the immobilizing portion affecting engagement of the control lever with the arm means on said second actuating member, rotation of the control lever with said quill so as to move the control lever within said immobilizing slot affecting a concomitant rotation of said second actuating member to immobilize the transmission, and releasable locking means selectively to retain said control lever at that position within said immobilizing slot at which immobilization of the hydrostatic transmission has been effected.

9. A control unit, as set forth in claim 8, in which the locking means comprises a spring arm mounted on said housing, said spring arm having a blocking edge to engage said control lever and prevent retro-rotation thereof when moved to the desired position within the immobilizing portion of said guide slot, a release tab on said spring arm selectively to swing said blocking edge clear of said control lever.

10. A control unit, as set forth in claim 8, in which said locking means comprises a lateral offset in the immobilizing portion of said guide slot, said arm means being resilient biasingly to retain said control lever in said lateral offset.

References Cited
UNITED STATES PATENTS 2,691,080   10/1954   Kellogg _____ 74—471 X MILTON KAUFMAN, Primary Examiner

PO-1050
(5/69)

UNITED STATES PATENT OFFICE
CERTIFICATE OF CORRECTION

Patent No. __3,541,876__ Dated __November 24, 1970__

Inventor(s) __CHARLES F. GRESSARD__

It is certified that error appears in the above-identified patent and that said Letters Patent are hereby corrected as shown below:

```
Column 1, line 15, change "level" to -- lever --;
   "   4, line 37, change "counting" to -- mounting --;
   "   4, line 50, change "po-" to -- position --;
   "   4, line 54, change "core 59" to -- core 49 --;
   "   4, line 56, change "or" to -- of --;
   "   5, line 11, change "casting" to -- casing --;
   "   5, line 14, change "end" to -- ends --;
   "   5, line 19, change "unts" to -- nuts --;
   "   5, line 43, change "plate" to -- blade --;
   "   5, line 45, change "rocket" to -- rocker --;
   "   5, line 49, change "rocket" to -- rocker --;
   "   8, line 39, change "aflected" to -- affected --; and
   "   9, line 68, before "actuating" insert -- second --.
```

Signed and sealed this 6th day of July 1971.

(SEAL)
Attest:

EDWARD M. FLETCHER, JR.
Attesting Officer

WILLIAM E. SCHUYLER, JR.
Commissioner of Patents